Patented Feb. 8, 1949

2,460,799

UNITED STATES PATENT OFFICE 2,460,799

PRODUCTION OF ORGANOPOLYSILOXANE RESINS WITH THE AID OF ALUMINUM ALKOXIDE

Arthur J. Barry, Midland, Mich., assignor to The Dow Chemical Company, Midland, Mich., a corporation of Delaware No Drawing. Application February 21, 1947,
Serial No. 730,211

9 Claims. (Cl. 260—46.5)

This invention relates to an improved method for treating organopolysiloxanes to form complex resinous materials. It is particularly concerned with additives which promote rapid conversion of liquid or liquefiable organopolysiloxanes to heat-hardenable compositions.

The organopolysiloxanes employed as starting materials in this invention consist of one or more compounds of silicon containing in the molecule an average of from one to two monovalent hydrocarbon radicals, per silicon atom, attached directly to the atoms of silicon. The remaining valences of each silicon atom are substantially satisfied by oxygen linkages to other atoms of silicon. The process of this invention is advantageous for treating organopolysiloxanes, having the structure just described, which are liquid or liquefiable without decomposition when heated, e. g. at temperatures below 200° C. It is even more particularly adapted for treatment of said organopolysiloxanes which are normally liquid at room temperature.

Organopolysiloxanes suitable for use in this invention may be conveniently prepared by methods known to the art, e. g. by the hydrolysis and concurrent condensation of hydrolyzable organosilanes having an average of from one to two monovalent hydrocarbon radicals attached to the silicon atom, and in which all valences not taken up by hydrocarbon radicals are satisfied by readily hydrolyzable groups such as halogen atoms, hydrocarbonoxy radicals, etc. Examples of organosilanes which yield hydrolysis products within the scope of this invention include dimethyldiethoxysilane, $(CH_3)_2Si(OC_2H_5)_2$, diethyldichlorosilane, $(C_2H_5)_2SiCl_2$, ethylphenyldibromosilane, $(C_2H_5)(C_6H_5)SiBr_2$, methyltriethoxysilane, $CH_3Si(OC_2H_5)_3$, phenyltrichlorosilane, $C_6H_5SiCl_3$, methylphenyldichlorosilane, $(CH_3)(C_6H_5)SiCl_2$, etc., or mixtures of such compounds. In some instances, the material to be hydrolyzed may also contain small amounts, e. g. 10 percent or less, of inorganic silicon halides, such as silicon tetrachloride, silicon tetrabromide, etc.

As is known, organosilanes of the types just illustrated react with water, and the hydrolysis products condense to form organosiloxane polymers. Frequently these products are distillable liquids, which may be further polymerized, e. g. by condensation of residual hydroxyl groups, or by oxidation of hydrocarbon radicals, to form intermediate organopolysiloxanes of much greater molecular weight and correspondingly greater body or viscosity. The latter polymers in turn are often heat-hardenable, that is, upon being subjected to prolonged heating, they ultimately set up or cure to complex, solid, non-liquefiable, resinous products which are resistant to organic solvents, and accordingly are suitable materials for coatings, binders, molding compounds, etc. In some instances, e. g. when the organic portion of the polysiloxane comprises mostly phenyl radicals, the intermediate polymers are solid at ordinary temperatures, but soften when heated, and are only difficultly converted to the more desirable non-liquefiable solids.

A number of methods are known for the conversion of liquid or liquefiable organopolysiloxanes to the intermediate, heat-hardenable polymers, but such methods are not always satisfactory. Among the known methods are oxidative processes, which involve displacement of hydrocarbon radicals by oxygen atoms to form additional oxygen-linkages between atoms of silicon; rigorous conditions of hydrolysis, e. g. heating in the presence of mineral acids; long heating at elevated temperature whereby rearrangement takes place within the polysiloxane material with the formation of complex high polymers, etc. In many instances, hydrocarbon radicals are lost, e. g. by oxidation, or hydrolysis, etc., from the organosiloxane starting materials during conversion of the latter to heat-hardenable materials. When a liquid organopolysiloxane contains an average of about 2, e. g. 1.8 to 2.0, hydrocarbon radicals per atom of silicon, it is particularly difficult to convert the liquid to a hard, non-liquefiable solid by methods heretofore known to the art without removal of hydrocarbon radicals. When the average number of hydrocarbon radicals per silicon atom is low, e. g. 1.0 to 1.5, a liquid organopolysiloxane may be solidified much more rapidly by known methods, but the product is frequently brittle or has low flexural strength.

It is an object of this invention to provide an improved method for rapidly converting liquefiable organopolysiloxanes to complex, heat-hardenable, resinous polymers. It is a further object to provide a method whereby very few, if any, hydrocarbon radicals are removed from the material during such conversion. It is a still further object to provide a method for producing non-liquefiable, solid, complex polymers which are resinous and not brittle in character. Other objects will be apparent from the following description of the invention.

Briefly, I have found that an aluminum alkoxide may be added to a liquefiable organopolysiloxane to produce a heat-hardenable resinous material having desirable and useful properties not possessed by the untreated material. The process causes little or no cleavage of hydrocarbon radicals from the silicon atoms (such as was obtained by Evison et al., J. C. S. 134 2774-8, (1931), on treating organopolysiloxanes with aluminum chloride) and the product contains the aluminum atoms, apparently as an integral part of a complex molecule. An organosiloxane polymer admixed with a minor amount, e. g. less than approximately 20 percent by weight, of an aluminum alkoxide may be cured or solidified at a given temperature in shorter time than the untreated material. Solid organopolysiloxanes which ordinarily liquefy at elevated temperatures may be modified by the addition thereto of minor amounts of an aluminum alkoxide so as to decrease their fusibility and increase their thermosetting properties.

Examples of aluminum alkoxides which may be employed include aluminum ethoxide, $Al(OC_2H_5)_3$, aluminum propoxide, $Al(OC_3H_7)_3$, aluminum butoxide, $Al(OC_4H_9)_3$, etc. Aluminum alkoxides or alcoholates may be prepared by methods known to the art, e. g. by reacting aluminum with an absolute alcohol in the presence of mercuric chloride and iodine. The solid aluminum alkoxide may be dispersed directly in the liquid organopolysiloxane, or may be employed as a solution in an organic solvent, such as a liquid hydrocarbon, which is miscible with the organopolysiloxane.

The amount of an aluminum alkoxide employed varies, of course, with changes in the starting materials and operating conditions, but usually lies within the range of from 0.01 to 20, and preferably 0.10 to 5.0 parts by weight of an aluminum alkoxide for each 100 parts of organopolysiloxane. In general, the more aluminum alkoxide used, the more rapidly the product cures or sets up to a solid, solvent-resistant state. When the resinification mixture contains higher proportions of an aluminum alkoxide, e. g. quantities greater than about 20 percent, based on the weight of organopolysiloxane, the rate of solidification is frequently too rapid to permit utilization of intermediate stages of viscosity. However, resinification mixtures containing more than 20 percent of an aluminum alkoxide may be solidified at moderate temperatures, e. g. from room temperature to 150° C., to produce bodies which do not soften appreciably upon being heated at higher temperatures and they may be employed when such results are desired. When a fairly viscous intermediate resinification mixture is desired, e. g. for use as, or in, a varnish or other film-forming composition, the organopolysiloxane starting material is preferably treated with from 0.1 to 5 percent by weight of an aluminum alkoxide. A liquid mixture of an organopolysiloxane and from 0.1 to 5 percent of an aluminum alkoxide may be heated to effect resinification or thickening at a controlled rate and the process may be interrupted, e. g. by cooling the mixture, at any point so as to obtain a resinification mixture having the desired viscosity. The resinification mixture thus obtained undergoes little or no change in viscosity at room temperature over long periods of time, e. g. a month or more. During application for the intended purpose the resinification mixtures are heated to solidify the same.

The optimum temperature for carrying out the process of this invention depends to a large extent upon the type of product and the rate of resinification desired, but in general lies within the range of from 100° to 300° C., and is usually from 125° to 250° C. For example, a mixture comprising 0.10-5.0 parts of an aluminum alkoxide per 100 parts of an organopolysiloxane when heated at a temperature in the lower portion of the range, e. g. below 175° C. or thereabout, will thicken or body at a rate which permits interruption of the process at an intermediate stage of viscosity. Heating a similar mixture at a temperature in the upper portion of the range, e. g. 300° C. or thereabout, usually results in a very rapid rate of setting up of the mixture, and does not warrant recovery of any intermediate products.

The resinification is advantageously conducted under anhydrous conditions. Accordingly, the organopolysiloxane should be substantially free of water prior to treatment with an aluminum alkoxide. The presence of free acid, e. g. a hydrogen halide, in the polymerization mixture is also detrimental.

The following examples are illustrative of modes of applying the principle of the invention, but are not to be construed as limiting its scope:

EXAMPLE 1

Equimolecular weights of phenyl magnesium chloride and ethyltrichlorosilane were reacted in diethyl ether solution. The resultant product was hydrolyzed by adding the ethereal slurry to water with stirring. After removing the aqueous layer which separated, the product was washed several times with water, and subsequently purified by volatilization of ether and residual water. A thin, liquid phenylethylsiloxane was obtained.

In a series of experiments, to each of several portions of liquid phenylethylsiloxane polymer prepared in a manner similar to that described above, was added aluminum isopropoxide, and each mixture was heated in a Stormer viscosimeter at temperatures of from 147° to 157° C. The product was applied as a film approximately 2 mils in thickness to metal panels, and heated at 250° C. until tack-free. Subsequently, the coated panels were maintained at 250° C., until the coating lost its flexibility, as determined by cooling to room temperature, and bending over an eighth inch mandrel. The appearance of cracking indicated loss of flexibility. The following table lists the proportion of aluminum isopropoxide present in each mixture, expressed as parts by weight of aluminum isopropoxide per 100 parts of phenylethylsiloxane polymer. It also gives the temperature at which each mixture was heated, the number of hours of heating at that temperature to form an intermediate product having the viscosity indicated, the number of hours of heating at 250° C. required to dry a 2 mil film of the intermediate product to a tack-free condition, and the total number of hours of heating at 250° C. before the loss of flexibility occurred.

For comparison, Experiment 5 of the table shows the results obtained when another portion of the untreated phenylethylsiloxane material was bodied by a process employing sulfuric acid as a catalyst. About 0.18 percent by weight of sulfuric acid was added to the phenylethylsiloxane and steam was blown through the acidified mixture for 30 hours, while maintaining a temperature of approximately 206° C.

From the table it may be seen that the addition of aluminum isopropoxide to the phenylethylsiloxane permitted bodying of the latter at a temperature much lower than that required when an acid catalyst was employed. Moreover, the resinous products obtained in Experiments 1-4, employing aluminum isopropoxide, could be cast as films which cured in a much shorter time at 250° C. than a film cast from the acid-catalyzed polymerization product.

| Expt. | Al(OC₃H₇)₃, per cent | Temp., °C. | Time, hours | Viscosity stokes | Film Properties | |
|---|---|---|---|---|---|---|
| | | | | | Curing Time hrs. at 250° C. | Flex Life hrs. at 250° C. |
| 1 | 0.004 | 157 | 49 | 1.8 | 6-8 | >60 |
| 2 | 0.04 | 150 | 48 | 3.0 | 6 | 30 |
| 3 | 0.06 | 154 | 14.5 | 17.9 | Less than 1 | 12. |
| 4 | 0.07 | 147 | 23 | 17.7 | 1-2 | 8 |
| 5 | None | 206 | 30 | ¹4-5 | 15-20 | >60 |

¹ 70 percent solution in toluene.

EXAMPLE 2

A mixture comprising 13.7 molecular equivalent weights of phenylthichlorosilane, 50.7 mol equivalents of phenylmethyldichlorosilane and 35.6 mol equivalents of methyltrichlorosilane was hydrolyzed with water, and the product was purified by washing it with water. A thin, oily liquid was obtained which was not gelled after being heated at 150° C. for 1 hour. To 150 grams of the liquid was added 1.86 grams of aluminum ethoxide, and the mixture intimately blended. The product set to a gel after being heated at 150° C. for 35 minutes.

EXAMPLE 3

A liquid polysiloxane was prepared by hydrolyzing a mixture comprising 10 gram molecular equivalents of ethyltrichlorosilane and 1 gram molecular equivalent of phenylethyldichlorosilane. After removal of acid by washing, residual water was volatilized.

To 50 parts by weight of the liquid phenylethylpolysiloxane was added 1 part of aluminum butoxide, and 11 parts of finely divided asbestos. After thoroughly mixing, the product was heated for about 6 hours at 115° C. The solid, non-tacky material obtained was subsequently molded into bars at a temperature of 250° C. and a pressure of 2000 pounds per square inch, with satisfactory results. The molded product was infusible.

In another experiment, 2.8 parts by weight of aluminum butoxide was employed per 50 parts of phenylethylpolysiloxane. Asbestos was again used as filler. The mixture molded satisfactorily after being heated for 6 hours at 110° C.

EXAMPLE 4

A liquid methylpolysiloxane, containing an average of about 2 methyl radicals per silicon atom, and having a viscosity of 19.7 stokes at room temperature, and about 3.9 stokes at 150° C., was admixed with aluminum isopropoxide in the ratio of 100 grams of the former to 0.84 gram of the latter. The mixture was heated at about 151° C. in a Stormer viscosimeter. At the end of 62.5 hours, the material had a viscosity of 17 stokes at 151° C. The resultant product was applied to metal test plates by dipping. The panels, coated with an 0.7 mil film of the material, were heated at 250° C. After 30 to 35 hours, the coatings were tack-free. The dried film was still flexible without cracking when the coated panel was bent over an eighth inch mandrel. It remained flexible after heating of the panel at 250° C. for a total of 90 hours.

In comparison, a portion of the untreated liquid organosiloxane was still liquid after 100 hours of heating at 250° C.

Other modes of applying the principle of the invention may be employed, instead of those described, change being made as regards the steps or compounds herein disclosed, provided the steps or compounds stated by any of the following claims or equivalent of such steps or compounds be employed.

I therefore claim as my invention:

1. The method of making an organopolysiloxane resin which comprises reacting an organosiloxane polymer, having an average of from 1 to 2 hydrocarbon radicals, attached directly to silicon atoms, per atom of silicon, which organosiloxane polymer is initially in liquid state, with an aluminum alkoxide at temperatures between room temperature and 300° C., the aluminum alkoxide being employed in amount between 0.01 per cent of the weight of the organopolysiloxane and a maximum proportion which is varied inversely with the temperature in accordance with values of 5 per cent of the aluminum alkoxide at 300° C. and 20 per cent at 150° C.

2. The method of making a heat-hardenable organopolysiloxane which comprises treating a liquid organopolysiloxane polymer, having an average of from 1 to 2 hydrocarbon radicals per silicon atom, with aluminum isopropoxide at a reaction temperature between room temperature and 300° C., said aluminum isopropoxide being present in an amount corresponding to from 0.10 to 5.0 percent of the weight of the organosiloxane.

3. The method of claim 2, wherein the liquid organopolysiloxane is a methylpolysiloxane.

4. A heat-hardenable polysiloxane resin obtained by the method of claim 3.

5. The method which comprises admixing from 99.9 to 95.0 parts by weight of an organopolysiloxane, having an average of from 1 to 2 hydrocarbon radicals per silicon atom, with from 0.10 to 5.0 parts by weight of an aluminum alkoxide, heating the mixture at a reaction temperature of from 100° to 175° C., recovering a thermoplastic material and subsequently heating said material at a temperature below 300° C. to form a solid resinous product.

6. The method which comprises admixing from 99.9 to 95.0 parts by weight of a phenylmethylpolysiloxane, having an average of from 1 to 2 organic radicals per silicon atom, with from 0.10 to 5.0 parts by weight of aluminum ethoxide, heating the mixture at a temperature of from 100° to 175° C., recovering a thermoplastic material and subsequently heating said material at a temperature below 300° C. to form a solid, resinous product.

7. The heat-hardenable polysiloxane resin obtained by the method of claim 6.

8. The method which comprises admixing from 99.9 to 95.0 parts by weight of a phenylethylpolysiloxane having an average of from 1 to 2 organic radicals per silicon atom with from 0.10 to 5.0 parts by weight of aluminum butoxide, heating the mixture at a temperature of from 100° to 175° C., recovering a thermoplastic material and subsequently heating said material at a temperature below 300° C. to form a solid, resinous product.

9. The heat-hardenable polysiloxane resin obtained by the method of claim 8.

ARTHUR J. BARRY.

No references cited.